US008235726B2

(12) United States Patent
Hostettler et al.

(10) Patent No.: US 8,235,726 B2
(45) Date of Patent: Aug. 7, 2012

(54) PROCESS AND SYSTEM FOR SIMULATION OR DIGITAL SYNTHESIS OF SONOGRAPHIC IMAGES (75) Inventors: Alexandre Hostettler, Strasbourg (FR); Luc Soler, Wolfisheim (FR); Clément Forest, Strasbourg (FR); Jacques Marescaux, Scharrachbergheim (FR)

(73) Assignee: Institut de Recherche sur les Cancers de l'Appareil Digestif (IRCAD), Strasbourg (FR)

( * ) Notice: Subject to any disclaimer, the term of this patent is extended or adjusted under 35 U.S.C. 154(b) by 1116 days.

(21) Appl. No.: 11/795,815

(22) PCT Filed: Jan. 23, 2006

(86) PCT No.: PCT/FR2006/000150
§ 371 (c)(1),
(2), (4) Date: May 12, 2008

(87) PCT Pub. No.: WO2006/077337
PCT Pub. Date: Jul. 27, 2006

(65) Prior Publication Data
US 2009/0046912 A1    Feb. 19, 2009

Related U.S. Application Data

(60) Provisional application No. 60/645,595, filed on Jan. 24, 2005.

(51) Int. Cl.
*G09B 23/28* (2006.01)
(52) U.S. Cl. ......... 434/262; 600/407; 600/410; 600/437
(58) Field of Classification Search .................. 434/219, 434/262; 703/2, 6, 13; 600/443, 497, 410, 600/437
See application file for complete search history.

(56) References Cited

U.S. PATENT DOCUMENTS

| 5,609,485 A * | 3/1997 | Bergman et al. ............. 434/262 |
| 6,016,439 A * | 1/2000 | Acker .......................... 600/411 |
| 6,032,066 A * | 2/2000 | Lu et al. ....................... 600/407 |
| 6,210,168 B1 | 4/2001 | Aiger et al. |
| 6,544,041 B1 * | 4/2003 | Damadian ..................... 434/262 |
| 6,901,159 B2 * | 5/2005 | Baertsch et al. ............. 382/132 |
| 2002/0168618 A1 * | 11/2002 | Anderson et al. ............. 434/262 |
| 2004/0009459 A1 * | 1/2004 | Anderson et al. ............. 434/262 |

OTHER PUBLICATIONS

Hostettler et al., "Real-time ultrasonography simulator based on 3D CT-scan images," Studies in Health Tech and Informatics, vol. 111, pp. 191-193 (Jan. 26, 2005).
Jensen et al., "Fast simulation of ultrasound images," IEEE Ultrasonics Symp., vol. 2, pp. 1721-1724 (2000).
Ehricke, "SONOSim3D: a multimedia system for sonography simulation and education with an extensible case database," Eur. J. of Ultrasound, vol. 7, No. 3, pp. 225-230 (Aug. 1998).

* cited by examiner

*Primary Examiner* — Kang Hu
(74) *Attorney, Agent, or Firm* — Young & Thompson (57) ABSTRACT

The invention relates to a method for the simulation or digital synthesis of echographic images, characterized by the direct transformation in real time, or quasi real time, of the information contained in an IRM-type medical or veterinary image, without delimitation or segmentation of the bodies or structures contained in the volume of data of the IRM image, according to at least one two-dimensional observation window which can be modified in real time, or quasi real time, in terms of the dimension, position, direction and orientation thereof, the characteristics thereof depending on the type of virtual echographic probe determined, and reproducing all of the attenuation, reflection, refraction and dispersion effects, and the regulation effects of a real echographic image, each echographic image supplied cumulating the results of the simulations of the pre-cited effects.

20 Claims, 4 Drawing Sheets

PROCESS AND SYSTEM FOR SIMULATION OR DIGITAL SYNTHESIS OF SONOGRAPHIC IMAGES

This invention relates to the field of imaging and exploration techniques, in particular in the medical field and more particularly within the context of the simulation or the synthesis of virtual images, and it has as its object a process and a system for simulation or digital synthesis of sonographic images that may or may not be flat.

So as to train its students, modern medicine is beginning to acquire increasingly improved medical simulators.

The simulators have proven their value in the military and aeronautical fields and offer a rather significant number of advantages:

the simulator does not monopolize equipment that is useful to the actual activity;

the diversity of the simulations is very significant, from the common situation up to rare cases;

aids that were inconceivable in traditional training can be installed: to watch all or part of its actions from an identical or different viewpoint, or to be able to restart the unsatisfactory portion of the simulation as many times as necessary;

the simulation makes possible a reliable and objective evaluation of the acquired aptitudes; and primarily, it makes it possible to simulate situations in which risks are very high for novices and/or the patient.

Thus, to make it possible in particular during training sessions with surgeons to monitor the positioning and the movement of instruments within the body of a patient, a need exists for a process and a tool that can synthesize sonographic images in real time or quasi-real time.

Sonography, whose technique and characteristics are well known to one skilled in the art, offers many advantages relative to the other imaging techniques: it is not harmful at a high dosage unlike radiography and scanning, the cost of the equipment and that of the examinations is lower, and the space requirement for the sonographs is small. In addition, in a large majority of cases, before prescribing a more intensive examination such as magnetic resonance imaging, sonography of the zone that is involved in the pathology of the patient is carried out. Finally, the rapid image acquisition imparts thereto a dynamic nature that is very advantageous for observation or guidance. The principle of the invention rests on the direct transformation of images by nuclear magnetic resonance NMR (or NMR), also denoted magnetic resonance imaging (or MRI) below, into sonographic images. So as to understand the invention, it is therefore necessary to describe succinctly the principles of these various images.

Magnetic resonance imaging (MRI) is a diagnostic technique that provides sectional images of great anatomical precision without using x-rays or other types of radiation. The MRI is based on the physical phenomenon of nuclear magnetic resonance (NMR). It uses the properties of the material and involves only the hydrogen cores that are very abundant in the human body. A hollow cylindrical magnet provides an intense magnetic field (typically 1 to 3 Tesla) that is about 60,000× stronger than the Earth's magnetic field. This magnetic field shows a magnetization within the various tissues of the organism that is due to the hydrogen cores, as if each core acted as a small compass. The magnetic resonance phenomenon makes it possible to measure this magnetization. For this purpose, the hydrogen cores are disturbed by emitting an electromagnetic wave toward the patient. Under the effect of this pulse, the hydrogen cores alternate their magnetization relative to the direction of the magnetic field. At the end of the pulse, the magnetization returns to its equilibrium position: the return of the magnetization to this equilibrium state is measured. The images that are obtained will be very different according to the adjustments of the selected device and the type of information sought. The primary images thus will depend on the weighting that could be of type T1 (calculation of the relaxation according to the longitudinal axis of the magnetization), or T2 (calculation of the relaxation along the transversal axis of the magnetization), in proton density, in FLAIR (fluid attenuation inversion recovery) mode, in T2*, whereby each of these images can be produced in spin echo mode or gradient echo. Regardless of the adjustments, the presence of hydrogen cores and therefore water are in the image that will characterize these images. The gray levels thus will vary based on this density, but will be very variable from one image to the next, whereby the relaxation time of the structures that are passed through is decisive of the final gray level in the MRI image.

It is important to note that this relaxation time will be all the shorter as the visualized structures will be dense and will have little water. Conversely, the water will have a very long relaxation time.

By way of examples, the table below indicated, for various media, the corresponding intensity in an obstetric T2-type MRI image. Of course, these values are very dependent on the adjustment of the equipment and conditions and acquisition mode.

| Medium | Example of Intensity in a T2 Image |
| --- | --- |
| Air | 15 |
| Amniotic Fluid | 50 |
| Bone | 120 |
| Liver | 190 |
| Skin of the Fetus | 250 |
| Skin of the Mother | 500 |

Sonography is a medical imaging technique that uses ultrasound to obtain an image of the inside of the body. The probe of the sonograph sends ultrasound that returns with the probe, after being reflected on the organ to be studied, so as to be processed by a computer. The sonographic image is therefore a reflective image. The reflection of the ultrasonic beam is done on the interfaces that are constituted by tissues that have various acoustic impedances and also to a lesser extent on the irregularities of these tissues because of the dispersion. The ultrasonic pulses obey the same laws of propagation, reflection and refraction as those of optics. Finally, the ultrasonic beam is attenuated based on the nature of the organs through which it passes.

The decisive parameters in the propagation of sounds in the various media are density or mass by volume (d) and the propagation speed of the sounds (v).

The acoustic impedance (Z) is defined by the product of these two characteristics of the medium: $Z = d \times v$. The table below indicates the acoustic impedances for various media that are present in all human or animal bodies.

| Medium | Acoustic Impedance $(kg \cdot m^{-2} \cdot s^{-1}) \times 10^6$ |
| --- | --- |
| Air | 0.0004 |
| Lung | 0.26 |
| Skeleton | 3.8-7.4 |
| Soft Tissue | 1.3-1.7 |
| Water | 1.5 |

The four physical phenomena that come into play in the behavior of an ultrasonic wave are: reflection, refraction, attenuation and dispersion.

a) Reflection and Refraction

Figure 1:
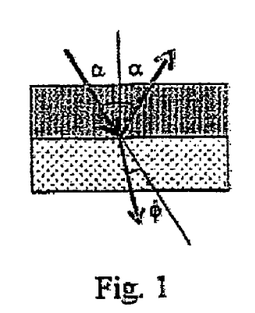
FIG. 1 illustrates the refraction phenomenon in connection with an ultrasonic wave.

An echo is a sound (acoustic wave) that is reflected and that is received after a latent period, corresponding to its period of movement in the medium concerned. When the ultrasonic beam arrives on a reflective surface with an oblique angle, a portion of the beam is reflected with a reflection angle that is equal to the incidence angle. This is a reflection phenomenon. The portion that is transmitted is deflected with an angle that depends on the propagation speed of the two media that are involved. This is a refraction phenomenon (see FIG. 1, attached). The proportion of reflected ultrasound, or reflection coefficient, is linked directly to the acoustic impedance difference between two media. This magnitude is characteristic of the nature of the media. It is located at normal incidence because as soon as the incidence angle is more than 12°, the reflected energy decreases by a factor of $10^4$: this is equivalent to saying that the reflected beam is no longer picked up. Several reflective coefficients for sonography can be calculated from acoustic impedances. The results of these calculations are indicated in the table below:

| Interface | Reflection Coefficient in Normal Incidence |
| --- | --- |
| Water/Air | 0.9989 |
| Water/Bone | 0.2899 |
| Adipose Tissue/Kidney | 0.0083 |

These values show that in the body, the great acoustic impedance differences are encountered between soft tissues and air and between soft tissues and hard tissues (bone, stones, foreign bodies). Such interfaces are very reflective or very "echogenic" (echo generators). Behind these interfaces, a shadow zone appears since much of the acoustic signal has been reflected.

In sonography, the interaction of the ultrasonic beam with a smooth, oblique surface entrains a disappearance of the signal, because no acoustic signal returns directly to the probe after the oblique reflection, and the beam changes direction after refraction. This phenomenon is responsible for an artifact that is frequently called an "edge shadow." The influence of the angle of the ultrasound on the sonographic aspect of the organic structures that are observed is more or less marked. Tendons and ligaments are part of the so-called anisotropic structures for which the sonographic aspect is greatly influenced by the direction of the ultrasonic beam.

In addition, the combination of wave reflection and refraction can induce multiple rebounds between the probe and the interface, creating phantom echoes behind the interface that are called "repetitive echoes," whereby the echoes are trapped between two reflective interfaces before returning to the sonographic probe.

b) Attenuation

Attenuation is the loss of intensity of the sonographic signal based on the depth of the penetration of tissues and their compositions. The monograph will automatically compensate for this reduction by amplifying the signal that is received so as to cancel the attenuation that the ultrasonic wave would have undergone if it had passed through only wet tissues. In the case where the tissues that are passed through by the ultrasonic beam do not have the attenuation characteristics of the wet tissues, there is either a reinforcement (this happens with a liquid, which will have a lesser attenuation power than that of the soft tissues) or the appearance of shadow cones (this happens with bone or gas, which will have more attenuating power than that of the soft tissues).

Nevertheless, the attenuation of the signal can be compensated only up to a certain limit from which the signal is not significant enough relative to the noise. For various frequencies, the table below indicates the maximum exploration depth of the ultrasound.

| Frequency of the Ultrasound | Maximum Exploration Depth |
| --- | --- |
| 2.5-3.5 MHz | >15 cm |
| 5 MHz | 10 cm |
| 7.5 MHz | 5-6 cm |
| 10-12 MHz | 2-3 cm | c) Dispersion

Figure 2A:
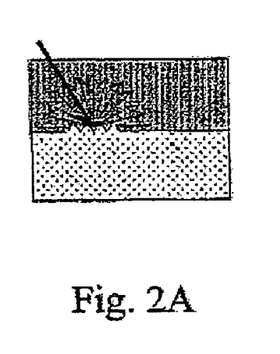
FIGS. 2A and 2B illustrate the phenomenon of dispersion in connection with an ultrasonic wave.
Figure 2B:
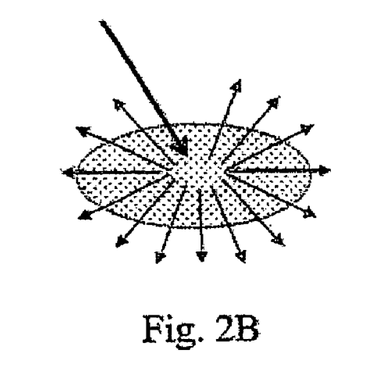

In the sonographic images, the heterogeneous media are shown by dispersion echoes. The echogenicity (the capacity to generate echoes) of parenchymatous organs, for example, is essentially formed by dispersion echoes, whose intensity depends on the tissue homogeneity (see accompanying FIGS. 2A and 2B).

In conclusion, it turns out that the signal processing carried out by the computer of a monograph, so as to construct real ultrasonic images, rests on a certain number of hypotheses:
1) The direction of the ultrasonic beam is unique
2) There are not multiple reflections
3) The absorption of the medium is equivalent to that of the wet tissues
4) The propagation speed of a wave amounts to 1540 m/s.

When one or more of these hypotheses are false, parasitic echoes, which do not correspond to a real structure, appear in the image: these are artifacts. The base information of a sonographic image thereby rests on the properties of reflection, refraction, attenuation and dispersion of tissues. By taking into account these various effects, the ultrasonic image is reconstituted from information collected by the probe and transmitted to the device. The data are processed by complex software that makes it possible to determine the position and the intensity of the echo and to display the image (or the signal) for interpretation by the operator.

Figure 3A:
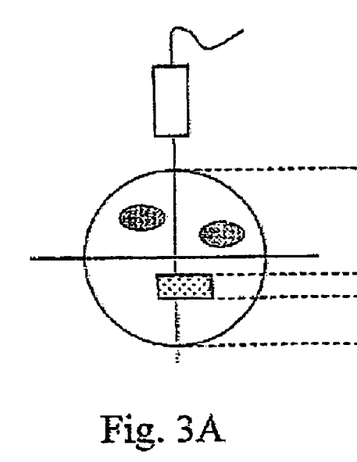
FIGS. 3A and 3B illustrate the use of a single beam sonographic probe and the collected signal, according to a first mode.
Figure 3B:
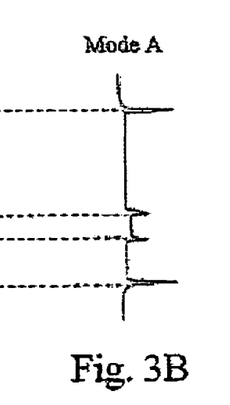

Finally, the sonographic image can be shown according to several modes:

The first mode is the mode of showing the most primitive image. It consists in displaying the signal amplitude that is collected by the probe based on depth (FIG. 3B). A single ultrasonic beam of constant direction is used (FIG. 3A). This mode was formerly used in pediatric neurology and in ophthalmology.

Figure 4A:
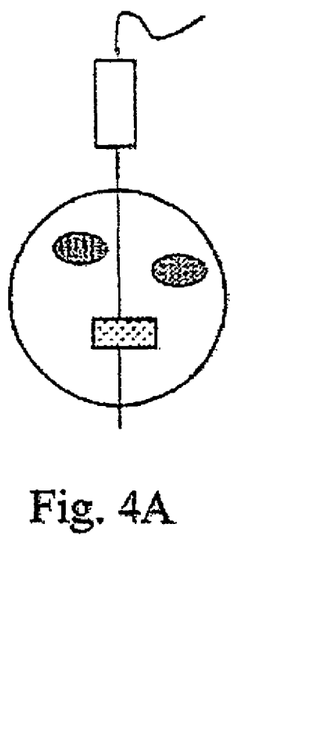
FIGS. 4A and 4B illustrate the use of a single beam sonographic probe and the collected signal, according to a second mode.
Figure 4B:
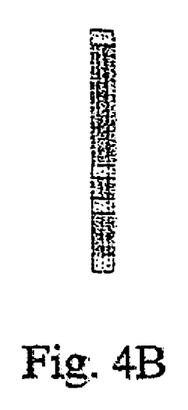

The second brightness mode is the most common display mode. It is a matter of showing the intensity of the signal no longer by a curve but by the brightness of a point on the screen. The brighter the point, the greater the reflection of the ultrasound, and therefore the more intense the echo (see accompanying FIGS. 4A and 4B).

Figure 5A:
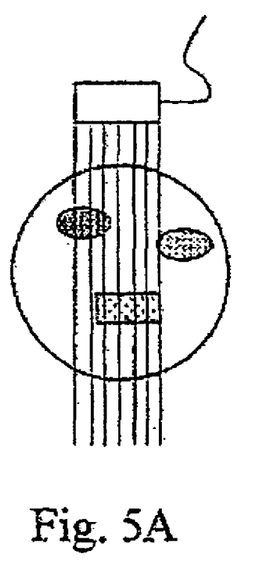
FIGS. 5A and 5B illustrate the use of a multiple beam sonographic probe and the collected signal, according to an alternative embodiment.
Figure 5B:
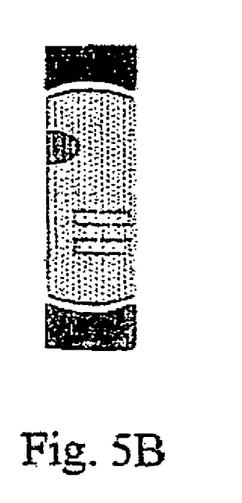

When several ultrasonic beams that are parallel to one another are used (linear probe) or when the same ultrasonic beam is oriented in various directions (sector probe), an image is obtained in 2 (two) dimensions (two-dimensional), which shows a section of the explored structure (see accompanying FIGS. 5A and 5B).

Starting from the report given by the inventors of a similarity between the proton density of a tissue that can be seen by an MRI image with the acoustic impedance of this same tissue that can be seen in a sonographic image, the invention essentially consists in reproducing by simulation a sonographic image that reproduces all of the effects of attenuation, reflection, refraction and dispersion. The primary characteristics of the process according to the invention emerge from the accompanying claim 1 and additional characteristics emerge from the accompanying claims 2 to 9.

The invention consists more specifically in reproducing two-dimensional images (showing one or more sonographic planes) by simulating several ultrasonic beams that are emitted from a virtual probe that can be controlled in position and in orientation and positioned in the volume of the MRI medical image.

As indicated above, the significant reflection phenomena of the wave will be observed at the level of interfaces between the liquids or the soft tissues, on the one hand, and the air or the bones, on the other hand. Actually, the largest reflection coefficients in normal incidence are observed between structures whose gray levels may be sufficiently removed in an MRI image according to the selected acquisition sequence. Any MRI image therefore cannot meet this criterion, and only the MRI images that make possible a variation of the various structures that it is sought to observe will then be transformable into sonographic images.

The significant variations of the gray level between these various structures can easily be calculated in real time along the ray that is traced in such an MRI image. This gradient can then be reflected by a reflection whose order of magnitude can be parameterized in an interactive way or calculated automatically.

The primary advantage of this method that is implemented by the invention thus rests on the non-necessity of carrying out an initial segmentation of the organs to create a sonographic image from an MRI image without pretreatment and in real time, which represents one of the primary advantages of the invention.

Thus, the invention has as its object a process for simulation or for digital synthesis of sonographic images, characterized by the direct transformation in real time, or quasi-real time, of information that is contained in an MRI-type medical or veterinary image, without delimitation or segmentation of organs or structures that are contained in the MRI image volume of data, according to one or more two-dimensional observation windows that can be modified in real time, or quasi-real time, in dimension, in position, in direction and in orientation, whose characteristics are based on the type of a determined virtual sonographic probe and that reproduces all of the effects of attenuation, reflection, refraction and dispersion and effects of adjusting a real sonographic image, whereby each sonographic image that is provided accumulates the results of the simulations of the above-mentioned effects.

According to a first characteristic of the invention, the process advantageously carries out the simulation of two-dimensional sonographic images of which the observation window is obtained by the simulation of several ultrasonic beams, oriented parallel to one another in the manner of a linear probe or oriented in various divergent directions in the manner of a sector probe, corresponding to a set of straight segments that originate from a virtual source characterizing the shape, the direction, the orientation and the dimension of the virtual probe and whose modifiable length makes it possible to simulate the frequency of the ultrasound by determining the maximum exploration depth.

In the data volume forming the three-dimensional MRI image, a flat section is thus produced with acquisition of data that are contained in the portion of the plane defined by the above-mentioned straight segments or by means of data located on both sides of said plane portion (in the case of the absence of data on said plane portion) so as to obtain a two-dimensional data matrix extracted from said 3D MRI image. According to a possible development of the invention, it may also be provided that the process carries out the simulation of three-dimensional sonographic images defined by several two-dimensional observation windows that are simulated and oriented with differential offsets relative to the position and the orientation of the virtual probe, either around its axis, whereby each window is then characterized by a different angle around the median axis of this probe, or at the end of this probe, whereby each window is then characterized by a different angle around the perpendicular axis in the plane of observation of this probe.

According to the invention, the process preferably consists in creating one or more analysis window(s) or space(s) for the simulation of two-dimensional or three-dimensional sonographic images, window(s) or space(s) defined by the plane or the volume in which a virtual acoustic wave that is simulated by a set of straight segments originates at the virtual sonographic probe and ultimately represents a rectangle, a partial disk, a tube or a spherical portion centered on the origin of the probe, whereby this volume varies based on the degree of precision of the final simulation of the sonographic image.

The process advantageously comprises the simulation of the effects of dispersing ultrasound via the structures that are passed through and that are present in a real sonographic image, whereby this simulation results in the creation of an absorption image that is limited to the observation window that is defined above, obtained by transformation of the intensity levels n that are contained in the MRI image that is limited to the analysis window or to space that is also defined above, at the gray level l(n) of a sonographic image, by the definition and the application of a transfer function/simulating the orders of magnitudes of the acoustic impedance values of the structures that are passed through, whereby said function may or may not be continuous, or may or may not be linear according to the methods, the type and the characteristics of the initial MRI image.

In addition, the process advantageously comprises the simulation of the effects of reflection, refraction and attenuation of the ultrasound by the interfaces that are passed through and that are present in a real sonographic image, whereby this simulation results in the creation, on the one hand, of an attenuation image that simulates the effects of sonographic shadows and the effects of sonographic reinforcements that are visible respectively beyond an interface between a wet tissue or a liquid and air or bone, and beyond an interface between a liquid and a wet tissue, and, on the other hand, an image or mask of multiple echoes, simulating the effects of reverberation of an ultrasonic echo inside a bone that is visible beyond an interface between a soft tissue or a liquid and bones, whereby these images are both limited to the observation window defined above and obtained along the trajectories of ray tracings that are oriented (defining the above-mentioned analysis window or windows or space(s)) by the detection in real time of interfaces that are calculated by thresholding, gradient and/or filtering techniques of the densities of the initial MRI image that is limited to the analysis window or to space that is defined according to claim 4. In addition, the process advantageously comprises the simulation of the dispersion noises that the ultrasound experiences in the tissues through which it passes or the effects of these noises. This simulation results in the creation of an image that is limited to the observation window that is defined above, simulating the effects of refraction and dispersion in a sonographic image, obtained by the calculation of the effects of refraction and dispersion of the tissues through which the simulated sonographic wave, described above, passes, whereby this simulation is carried out either by defining a general noise in the image or by simulating more specifically the above-mentioned effects by detecting and characterizing the interfaces between the various structures of the analysis window through which the sound passes. Finally, the process advantageously comprises the simulation of the effects of adjusting the virtual or simulated sonographic probe, resulting in the creation of an image or mask for limited adjustment to the observation window defined above and simulating the adjustments of luminosity, contrast, gain or any other adjustable parameter of the virtual or simulated sonographic probe as defined above.

Preferably, the process according to the invention carries out the creation of a sonographic image that is limited to the observation window defined above, and accumulates the results of the four different simulations that are described above.

As the foregoing indicates, the principle at the base of this invention consists, to produce sonographic images for synthesis, in using directly three-dimensional MRI images, preferably with great precision, without carrying out a cumbersome pretreatment phase that requires a significant amount of time and processing power.

To optimize the calculation of the sonographic image for synthesis, the propagation of the ultrasound can be modeled as a one-dimensional phenomenon.

To this end, a first stage of the process consists in carrying out a tracing of three-dimensional rays directly in the three-dimensional MRI image so as to collect all the voxels that are located in the plan for investigation of the simulated virtual probe. Each possible propagation direction for the ultrasonic wave corresponds to a line of the resulting two-dimensional image.

This image is then analyzed for the purpose of extracting therefrom two different pieces of information. On the one hand, the acoustic behavior of each pixel is estimated, and, on the other hand, interfaces that are cut or passed through by the rays (propagation directions) are detected, identified, and marked (wet tissues, bone, gas, liquid, . . . ).

These processing operations can be carried out in an unconnected state, optionally directly in the MRI image.

On the basis of these data, at least three different simulations are carried out, namely a simulation of the reflection effects of the ultrasound by the interfaces that are passed through (reverberation), a simulation of the absorption effects of the ultrasound by the structures that are passed through (attenuation), and a simulation of the effects of dispersion and a noise matrix, combined with a simulation of the adjustments of the virtual probe.

The first simulation provides a so-called "multiple echoes" image, created by using the knowledge of the nature and the position of the interfaces between the organs or the regions of various tissues. Thanks to this image, the multiple echoes are detected and shown. The second simulation provides an absorption image that shows the accumulation of the absorption characteristics of the materials and substances along the ultrasonic wave.

The third simulation provides the base image or the base texture that is generated by combining, for each pixel, the value that is read into the MRI image and the information relative to the nature of the tissues in question and its acoustic characteristics. The base image is also made blurry by using a randomly generated noise.

The final simulated sonographic image is the result of the merging or the combination of the three images at least mentioned above, limited to an observation window that is determined by the nature and the adjustment of the simulated probe, whereby said resulting image is also applied in a texture before its display.

Figure 6:
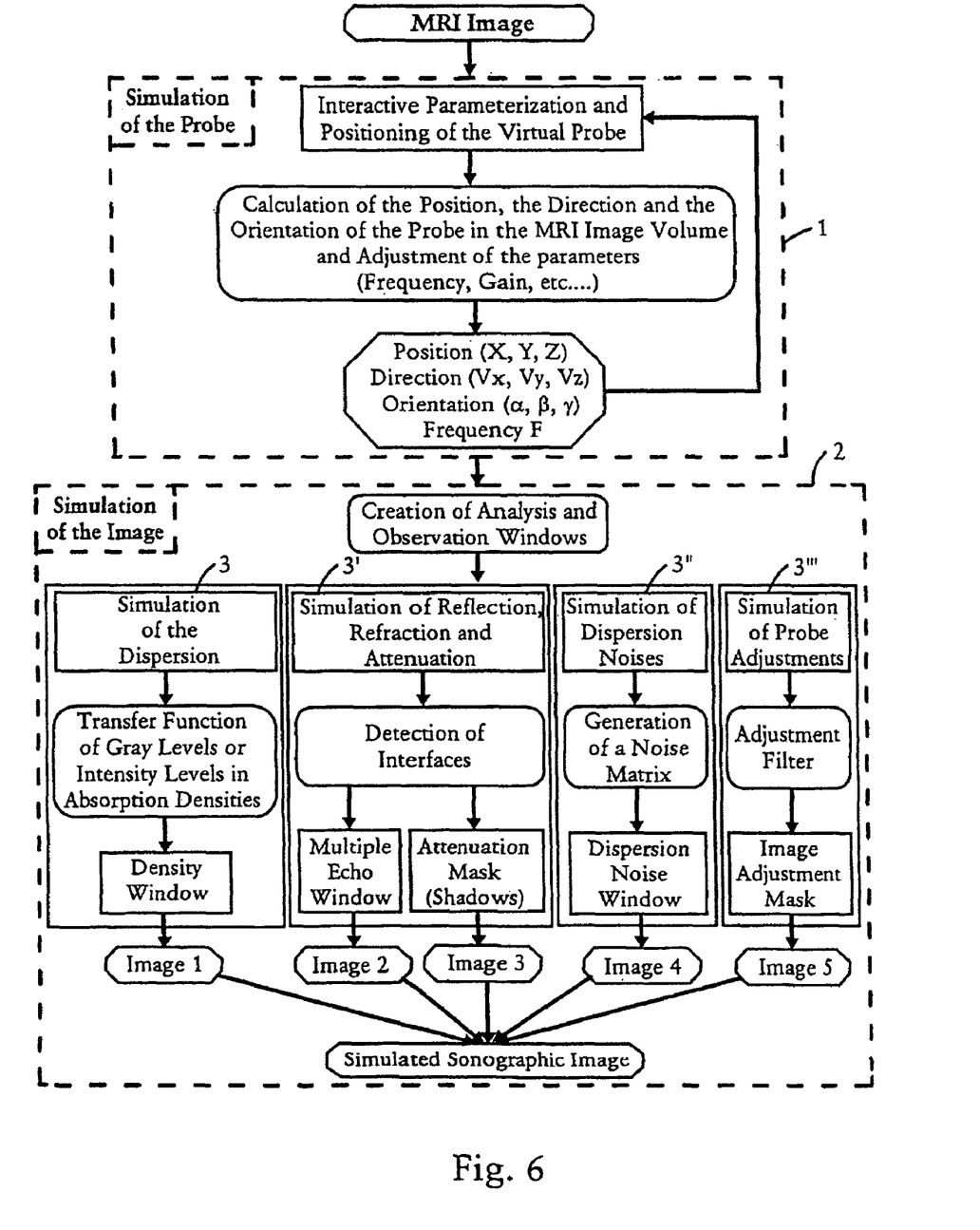
FIG. 6 is a flow chart type representation of the algorithm underlaying the process, according to the invention.
Figure 7:
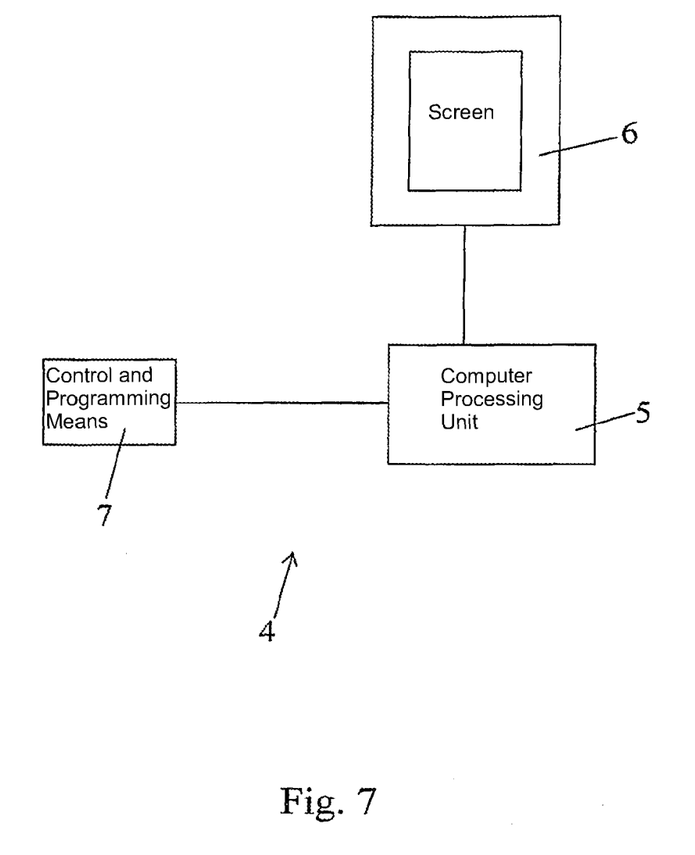
FIG. 7 illustrates schematically a simulator for implementing the process according to the invention.

The invention will be better understood thanks to the description below, which relates to a preferred embodiment, provided by way of nonlimiting example, and explained with reference to the accompanying diagrammatic drawings, in which: FIG. 6 shows, in the form of an algorithm, the primary operating and processing stages carried out by the process according to the invention, and FIG. 7 diagrammatically shows a simulator that implements the process according to the invention.

This implementation is based on a T2-type obstetric MRI image. The object is to simulate a prenatal sonography, and the algorithms that are described here have therefore been optimized to improve the rendering of structures that are specific to the fetus. For the simulation of another type of examination or of the same examination based on another type of MRI image, these algorithms could therefore be significantly different.

Taking into consideration the principle of the invention, it is primarily necessary to read the MRI-type medical or veterinary image whose data volume will supply the information base that allows the recreation of virtual sonography of the observed subject.

From this volume of data, the first module 1 of the algorithm consists in simulating the sonographic probe, i.e., in defining its static properties (2D or 3D probe, linear or sector probe) and its variable properties (position, direction, orientation, frequency of the emitted wave, gain, contrast, etc.). The implementation of this first module 1 is necessary for carrying out the invention that consists in creating a virtual sonographic image from a virtual or simulated probe.

The second module 2 (comprising four submodules 3, 3', 3", 3'''), which more particularly characterizes the invention, consists in creating the sonographic image that a real sonographic probe would generate, whose parameters are provided by the first module 1, if it were frequency-tuned, localized, directed, oriented and parameterized according to the information that is provided by the first module on a real subject of which a portion of anatomical characteristics are provided by the MRI image.

To generate this image, the sonography simulation module 2 consists of—as the accompanying FIG. 6 shows—four primary submodules 3, 3', 3", 3'" that respectively carry out the dispersion, the reflection, the refraction and the absorption (attenuation) of noises due to the refraction and the dispersion and effects due to the adjustment of the probe, such as the gain or the contrast, for example.

Before simulating these effects, the first stage of the simulation consists in defining the restricted space in which the simulated image will be recreated, as well as the analysis space that makes it possible to recreate the effects of absorption, reflection, and noises of refraction and dispersion on this image.

In the case of a 2D (two-dimensional) sonographic image, the space of the image will correspond to a limited plane in its dimensions by the dimension of the probe and the frequency of the signal that is emitted. If this is a linear probe, the shape of this space will be a rectangle whose width will be equal to the width of the probe, and the length will depend on the frequency, whereas in the case of a sector probe, the shape of this space will be a disk section whose ray will depend on the frequency.

In the case of a 3D (three-dimensional) sonographic image, the space of the image will actually consist of several 2D sector- or linear-type spaces.

The analysis space corresponds, for its part, to the simulation of the space for propagation and return to the probe of the ultrasonic waves. It may vary based on a compromise between realism and speed, which the user can define. On a less powerful computer, it may be possible, for example, to preserve an analysis space that is equal to the space of the image, but in this case, the tissues that are located outside of the space of the sonographic image cannot influence the image, as may be the case in the case of the refraction in particular. If the computer is more powerful, the broadening of the analysis space thereby will make it possible to improve the simulation while preserving a generation of real-time images. In absolute terms, it is useless to keep information beyond the maximum distance defined by the frequency of the waves emitted by the probe. The shape of the thus generated space will depend, there again, on the type of probe that is used and will lead either to a spherical portion (2D or 3D linear or sector probe), or to a full cylinder (endoluminal sonographic probe). Whereby these two windows are defined, the first sub-module 3 consists in simulating the dispersion phenomenon of tissues that are passed through by the ultrasonic waves. The principle of the invention consists, on this subject, in simulating this phenomenon by transforming each gray level or MRI image intensity into a gray level in the sonographic image. To carry out this transformation, a transfer function that transforms a gray level or intensity n in the MRI image into an intensity in the sonographic image is defined. This function can vary according to the MRI acquisition characteristics, according to the nature of the organs in which the simulation will be concentrated, and/or according to the desired level of realism. It can be, for example, algebraic or correspond to a simple table for correspondence of values. For some methods of MRI images (for example T2) that are carried out without injecting contrast product, a monotone function may be adequate: /échog,$r a_{ph} i_{qu}$ e f<$=coef*d. In contrast, for other acquisition methods or if the MRI image is produced with injection of contrast medium, which modifies the intrinsic characteristics of tissues, it will be necessary to define a more complex transfer function that corrects the contrasting of tissues that are normally darker in the MRI image.

Obviously, any function will bring about errors on certain values, since any transfer function can only attempt to simulate the real effect of the dispersion without ever being able to equal it, since, physically, the gray levels or the intensity of an MRI image and the absorption of ultrasonic waves remain two physically uncorrelated phenomena. Regardless of the level of precision of the transfer function, the approximations that it entrains can in all cases be diminished by the other effects of reflection, refraction or else absorption. The final result of this first sub-module 3 is the definition of a first image, corresponding to a sonographic window for visualization of gray levels without effect.

The second sub-module 3' has as its objective to simulate the phenomena of reflection, refraction and attenuation of interfaces that define the effects that are linked to these reflections, i.e., the shadows and the multiple echoes. The principle of the invention consists, on this subject, in simulating these phenomena that are oriented and directed based on parameters of the probe, i.e., limited to the visualization window, then in calculating the reflections based on the variations of gray levels or MRI image intensity. The definition of these interfaces can be carried out in several ways: either, for example, by calculating the gradient of the MRI image, or by calculating the gradient of the initial MRI image that is modified by a transfer function that is equal to or different from the transfer function that is defined in the first sub-module, or by any other method that makes it possible to end in a similar result.

Whereby the interfaces are defined, the shadow phenomenon will appear when the interface becomes too large, i.e., when the impedance difference of two adjacent tissues is too large. To simulate correctly the shadow effect, it is necessary to pick up on the orders of magnitudes of the reflection coefficients in normal incidence that are defined in a sonographic image. These coefficients show that a dark shadow will be obtained in the case of an interface between air and water and/or a wet tissue, and that a medium shadow will be obtained in the case of an interface between bones and water or a soft tissue. Air and the bones have very dark gray levels in an MRI image since they contain very little water and therefore very few protons, whereas the wet tissues and water may have median and high values of gray levels or intensity levels in an MRI image according to the selected method. The principle of the invention thereby will consist in creating—along the ray—a strong attenuation of the densities beyond an interface that is detected if the interface consists of very low values in this type of MRI image (corresponding to air or to bone). To characterize this attenuation, the simulation of this shadow will end in an image, called an attenuation mask, limited to the visualization window and whose real values will be between 0 and 1 so as to be able to multiply them by the value of the absorption window. The attenuation of the gray levels of the final image will therefore be obtained by multiplying the initial values by the attenuation value.

Certain minor interfaces can also produce a shadow phenomenon when they are not perpendicular to the direction of the ray. According to the refraction phenomenon described above, the latter is actually deflected from its axis and will return to the probe only in a very attenuated state. This phenomenon, named edge shadow, is very important in obstetric sonography and is primarily visible at the skull of the fetus. To correctly simulate this phenomenon, it is necessary to take into account the direction of the gradient of the image so as to determine the orientation of the interface. The more the latter is oblique, the more significant the phenomenon. The attenuation mask is therefore modified based on this result.

Certain interfaces can entrain various effects of the attenuation that are characterized by reinforcement. The reinforcement is a phenomenon for increasing gray levels in the direction of emitted ultrasonic waves that pass through a liquid. It can easily be reflected by a slight increase of densities beyond a detected interface if the interface is composed of very high gray levels in an MRI image (value that corresponds to liquids). To characterize this increase, the simulation of this reinforcement will consist in defining values of more than 1 in the reflection mask. In the sonographic images, reinforcement will also entrain a shadow effect on both sides of the liquid region. To characterize these shadows, the simulation will consist in defining values of close to 0 in the reflection mask.

The important interfaces can finally create an effect that is called a multiple echo and that corresponds to a replication of an interface in depth in the same axis of the rays that have defined the interface between soft tissue or water and bones or a solid element. The principle of the invention will thereby consist in creating a replication of the interface beyond a detected interface along the axis of each ray if this interface consists of gray levels or intensity levels that are close to 0 in the MRI image (corresponding to bone). To characterize this replication, the simulation of this multiple echo will end in an image, called a multiple-echo window, limited to the visualization window and whose values will make it possible to display the replications of the interface by increasing the gray levels of the sonographic image. It can therefore be a matter of a mask whose pixel value will be multiplied by the value of the gray levels of the absorption window or else an image whose gray level value will be added to the gray level value of the absorption window.

The third sub-module 3" has as its object to simulate the phenomena of dispersion noises. On this subject, the principle of the invention consists in simulating these phenomena by defining an image that will make it possible to modify the value of the gray levels of the absorption window. The simulation of these phenomena is without doubt the most complex since they are not taken into account by the reconstruction software of a real sonographic image and are thus characterized as a noise. Several methods could then be used based on a compromise between the realism of the effect, and the processing time to carry it out. The most simple method consists in calculating a random noise that reproduces a texture that is comparable to the noise that is observed in the sonographic images. A Gaussian noise that is oriented normal to the traced rays obtained from the virtual probe thus provides a first simple and rapid approximation of such a noise in real time. The most complex method consists in calculating the two effects independently by taking into account their characteristics.

The result of the third sub-module 3" ultimately will be an image or a mask that makes it possible to modify the intensities of the absorption image. The fourth sub-module 3''' has as its objective to simulate the adjustment parameters of the image provided by the sonographic probe. On this subject, the principle of the invention consists in simulating these adjustments that generally correspond to the contrast, to the luminosity or else to more or less complex gain functions, by a mask that makes it possible to modify the simulated sonographic image. These standard functions will therefore be translated into an image, called an image adjustment mask, which is limited to the visualization window and whose real values will be between 0 and n so as to be able to multiply them by the value of the simulated sonographic image. Ultimately, by combining all of the images that are obtained by each of these sub-modules 3, 3', 3", 3''' (the second sub-unit 3" able to provide two as FIG. 6 of the drawings shows), either by adding the gray levels of these images, or by multiplying them according to a function that can vary according to the specific definition of each of these images (mask multiplication, image addition), the principle of the invention consists in providing a simulated sonographic image that picks up each of the effects and adjustments of a real sonographic image.

A more detailed description of a practical and concrete embodiment of the process and the system according to the invention, in particular on the level of modules and sub-modules of the algorithm, is not necessary, whereby one skilled in the art is easily able, from characteristics described above and shown in the accompanying figures, to reproduce such an embodiment.

This invention also has as its object, as FIG. 7 of the accompanying drawing shows diagrammatically, a system 4 for simulation or digital synthesis of sonographic images or a real-time or quasi-real time sonographic simulator, comprising at least one computer processing unit 5 with memory, a screen 6 for visualizing (an) image(s) and at least one means 7 for control and programming for a user.

This simulator is characterized in that it implements the process for simulation or synthesis of digital images described above and in that said at least one means 7 for control and programming is at least able to indicate to the processing unit 5 the type of virtual sonographic probe to simulate as well as, in real time or quasi-real time, the various parameters for adjusting and handling this probe by the user, and optionally the 3D MRI-type medical or veterinary image that is selected by the user from among several available images.

Advantageously, said at least one means 7 for control and programming comprises a force or stress feedback interface making it possible to simulate the positioning characteristics of the probe relative to the virtual subject. Such interfaces are perfectly known to one skilled in the art.

Of course, the invention is not limited to the embodiment that is described and shown in the accompanying drawings. Modifications remain possible, in particular from the viewpoint of the constitution of the various elements or by substitution of equivalent techniques, without thereby exceeding the scope of protection of the invention. In particular, the processing assigned at each of the sub-modules of the second module optionally can be replaced by various alternative kinds of processing leading to similar or identical results.

In addition, as indicated above, the process according to the invention can be applied as much for the simulation of two-dimensional sonographic images as to three-dimensional sonographic images (reconstructed from two-dimensional images).

The invention claimed is:

1. A process for simulation or for digital synthesis of sonographic images to be carried out by a device comprising at least a computer processing unit and a memory readable by the computer processing unit, the process characterized by a direct transformation in real time, or quasi-real time, performed by the computer processing unit, of information contained in a medical or veterinary MRI image stored in the memory of the computer processing unit, without delimitation or segmentation of organs or structures that are contained in data of the image, according to one or more two-dimensional observation windows that can be modified in real time, or quasi-real time, in dimension, in position, in direction and in orientation, whose characteristics are based on a type of a determined virtual sonographic probe and that reproduces all effects of attenuation, reflection, refraction and dispersion and effects of adjusting a real sonographic image, whereby each sonographic image that is provided accumulates results of simulations of the above-mentioned effects.

2. The process according to claim 1, characterized by a simulation of two-dimensional sonographic images with an observation window obtained by a simulation of several ultrasonic beams, oriented parallel to one another in a manner of a linear probe or oriented in various divergent directions in a manner of a sector probe, corresponding to a set of straight segments that originate from a virtual source characterizing a shape, a direction, a orientation, and a dimension of the virtual probe and whose modifiable length makes it possible to simulate a frequency of the ultrasound of the ultrasonic beams by determining a maximum exploration depth.

3. The process according to claim 2, characterized by a simulation of three-dimensional sonographic images defined by several two-dimensional observation windows that are simulated and oriented with differential offsets relative to a position and an orientation of the virtual probe, either around its axis, whereby each window is then characterized by a different angle around a median axis of this probe, or at the end of this probe, whereby each window is then characterized by a different angle around an axis that is perpendicular to the plane of observation of this probe.

4. The process according to claim 2, characterized by a creation of an analysis window or space for the simulation of two-dimensional or three-dimensional sonographic images, defined by a plane or a volume in which a virtual acoustic wave that is simulated by a set of straight segments originates at the virtual sonographic probe and ultimately represents a rectangle, a partial disk, a tube or a spherical portion centered on an origin of the probe, whereby this volume varies based on a degree of precision of a final simulation of a sonographic image.

5. The process according to claim 4, further characterized by a simulation of the effects of dispersing ultrasound via the structures that are passed through and that are present in a real sonographic image, whereby this simulation results in a creation of an absorption image that is limited to the observation window of the simulation of two-dimensional sonographic images, obtained by transformation of intensity levels n that are contained in the MRI image that is limited to the analysis window or space, at the gray level 1(n) of a sonographic image, by a definition and an application of a transfer function (1) simulating orders of magnitudes of acoustic impedance values of structures that are passed through, whereby said function (1) may or may not be continuous, or may or may not be linear according to the methods, type, and characteristics of an initial MRI image.

6. The process according to claim 4, characterized by a simulation of effects of reflection, refraction and attenuation of the ultrasound of the ultrasonic beams by interfaces that are passed through and that are present in a real sonographic image, whereby this simulation results in creation, on the one hand, of an attenuation image that simulates effects of sonographic shadows and effects of sonographic reinforcements that are visible respectively beyond an interface between a wet tissue or a liquid and air or bone, and beyond an interface between a liquid and a wet tissue, and, on the other hand, an image or mask of multiple echoes, simulating effects of reverberation of an ultrasonic echo inside a bone that is visible beyond an interface between a wet tissue or a liquid and bone, whereby these images are both limited to the observation window of the simulation of two-dimensional sonographic images and obtained along the trajectories of ray tracings that are oriented by a detection in real time of interfaces that are calculated by thresholding, gradient and/or filtering techniques of densities of an initial MRI image that is limited to the analysis window or space.

7. The process according claim 4, characterized by a simulation of the dispersion noises that ultrasound of the ultrasonic beams experiences in tissues through which it passes or, if necessary, effects of these noises, whereby this simulation results in creation of an image that is limited to the observation window of the simulation of two-dimensional sonographic images, simulating effects of refraction and dispersion in a sonographic image, obtained by calculation of the effects of refraction and dispersion of the tissues through which the virtual acoustic wave passes, whereby this simulation is carried out either by defining a general noise in the image or by simulating more specifically the above-mentioned effects by detecting and characterizing the interfaces between various structures of the analysis window through which the ultrasound passes.

8. The process according to claim 4, characterized by simulation of the effects of adjusting the virtual or simulated sonographic probe, resulting in creation of an image or mask for limited adjustment to the observation window of the simulation of two-dimensional sonographic images and simulating adjustments of luminosity, contrast, gain or any other adjustable parameter of the virtual or simulated sonographic probe.

9. The process according to claim 4, characterized by creation of a sonographic image that is limited to the observation window of the simulation of two-dimensional sonographic images and that accumulates the results of the simulations according to each of:
  i) a creation of an absorption image that is limited to the observation window of the simulation of two-dimensional sonographic images, obtained by transformation of intensity levels n that are contained in the MRI image that is limited to the analysis window or space, at the gray level 1(n) of a sonographic image, by a definition and an application of a transfer function (1) simulating orders of magnitudes of acoustic impedance values of structures that are passed through, whereby said function (1) may or may not be continuous, or may or may not be linear according to the methods, type, and characteristics of an initial MRI image,
  ii) creation, on the one hand, of an attenuation image that simulates effects of sonographic shadows and effects of sonographic reinforcements that are visible respectively beyond an interface between a wet tissue or a liquid and air or bone, and beyond an interface between a liquid and a wet tissue, and, on the other hand, an image or mask of multiple echoes, simulating effects of reverberation of an ultrasonic echo inside a bone that is visible beyond an interface between a wet tissue or a liquid and bone, whereby these images are both limited to the observation window of the simulation of two-dimensional sonographic images and obtained along the trajectories of ray tracings that are oriented by a detection in real time of interfaces that are calculated by thresholding, gradient and/or filtering techniques of densities of the initial MRI image that is limited to the analysis window or space,
  iii) creation of an image that is limited to the observation window of the simulation of two-dimensional sonographic images, simulating effects of refraction and dispersion in a sonographic image, obtained by calculation of the effects of refraction and dispersion of the tissues through which the virtual acoustic wave passes, whereby this simulation is carried out either by defining a general noise in the image or by simulating more specifically the above-mentioned effects by detecting and characterizing the interfaces between various structures of the analysis window through which the ultrasound of the ultrasonic beams passes, and iv) creation of an image or mask for limited adjustment to the observation window of the simulation of two-dimensional sonographic images and simulating adjustments of luminosity, contrast, gain or any other adjustable parameter of the virtual or simulated sonographic probe.

10. A real-time or quasi-real time sonographic simulator, comprising:
at least one computer processing unit with memory;
a screen for visualizing images;
at least one means for control and programming for a user; and
a simulator that is characterized in that it implements the a process according to claim 1,
whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

11. Simulator according to claim 10, wherein said at least one means (7) for control and programming comprises a force or stress feedback interface that makes it possible to simulate positioning characteristics of the probe relative to a virtual subject.

12. A real-time or quasi-real time sonographic simulator, comprising:
at least one computer processing unit with memory;
a screen for visualizing images;
at least one means for control and programming for a user; and
a simulator that is characterized in that it implements the a process according to claim 2,
whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

13. A real-time or quasi-real time sonographic simulator, comprising:
at least one computer processing unit with memory;
a screen for visualizing images;
at least one means for control and programming for a user; and
a simulator that is characterized in that it implements the a process according to claim 3,
whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

14. A real-time or quasi-real time sonographic simulator, comprising:
at least one computer processing unit with memory;
a screen for visualizing images;
at least one means for control and programming for a user; and
a simulator that is characterized in that it implements the a process according to claim 4,
whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

15. A real-time or quasi-real time sonographic simulator, comprising:
at least one computer processing unit with memory;
a screen for visualizing images;
at least one means for control and programming for a user; and
a simulator that is characterized in that it implements the a process according to claim 5,
whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

16. A real-time or quasi-real time sonographic simulator, comprising:
at least one computer processing unit with memory;
a screen for visualizing images;
at least one means for control and programming for a user; and
a simulator that is characterized in that it implements the a process according to claim 6,
whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

17. A real-time or quasi-real time sonographic simulator, comprising:
at least one computer processing unit with memory;
a screen for visualizing images;
at least one means for control and programming for a user; and
a simulator that is characterized in that it implements the a process according to claim 7,
whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

18. A real-time or quasi-real time sonographic simulator, comprising:
at least one computer processing unit with memory;
a screen for visualizing images;
at least one means for control and programming for a user; and
a simulator that is characterized in that it implements the a process according to claim 8,
whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

19. A real-time or quasi-real time sonographic simulator, comprising:
- at least one computer processing unit with memory;
- a screen for visualizing images;
- at least one means for control and programming for a user; and
- a simulator that is characterized in that it implements the a process according to claim 9, whereby said at least one means (7) for control and programming is at least able to indicate to the processing unit (5) a type of virtual sonographic probe to simulate as well as, in real time or quasi-real time, various parameters for adjusting and handling this probe by the user, and, if necessary, the 3D MRI-type medical or veterinary image that is selected by a user from among several available images.

20. The process according to claim 3, characterized by a creation of an analysis window or space for the simulation of two-dimensional or three-dimensional sonographic images, defined by a plane or a volume in which a virtual acoustic wave that is simulated by a set of straight segments originates at the virtual sonographic probe and ultimately represents a rectangle, a partial disk, a tube or a spherical portion centered on an origin of the probe, whereby this volume varies based on a degree of precision of a final simulation of a sonographic image.

* * * * *